US006408023B1

(12) United States Patent
Abdesselem et al.

(10) Patent No.: US 6,408,023 B1
(45) Date of Patent: Jun. 18, 2002

(54) METHOD AND APPARATUS FOR PERFORMING EQUALIZATION IN A RADIO RECEIVER

(75) Inventors: Ouelid Abdesselem; Walter Kurtsiefer, both of Toulouse; Michel Le Joly, Tournesseulle, all of (FR)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/335,081

(22) Filed: Jun. 17, 1999

(30) Foreign Application Priority Data

Jun. 19, 1998 (EP) .............................. 98401510

(51) Int. Cl.[7] .......................... H03H 7/30; H03H 7/40; H03K 5/159
(52) U.S. Cl. ........................ 375/232; 708/323
(58) Field of Search ................... 375/232, 229, 375/233, 234, 235, 236; 708/322, 323; 333/18, 28 R

(56) References Cited

U.S. PATENT DOCUMENTS 5,251,233 A 10/1993 Labedz et al. ............. 375/12
5,541,956 A 7/1996 Ueda ....................... 375/232
5,563,911 A * 10/1996 Uesugi et al. ............ 375/232
5,946,351 A * 8/1999 Ariyavisitakul et al. .... 375/233
6,151,358 A * 11/2000 Lee et al. ................. 375/232
6,243,415 B1 * 6/2001 Pipon et al. .............. 375/232

OTHER PUBLICATIONS

Lindskog E et al: "Spatio–temporal equalization for multipath environments in mobile radio applications" IEEE Vehicular Technology Conference, p. 399 399 XP002076059 * abstract * * p. 402, right–hand column—p. 403, left–hand column *.

* cited by examiner

Primary Examiner—Chi Pham
Assistant Examiner—Phuong Phu

(57) ABSTRACT

An equaliser 100 for performing equalisation in a radio receiver receiving a signal from a transmitter, there being a Channel between the transmitter and the receiver having a Channel Impulse Response, CIR. The equaliser 100 comprises CIR estimation means 1 for generating a plurality of tap coeffecients; assessment means 2 for assessing the tap coeffecients generated by the CIR estimation means and for outputting an assessment signal; and an equaliser algorithm processing unit 5, adapted to receive the assessment signal, for selecting and performing one of a plurality of different equaliser algorithms on the basis of the assessment signal, whereby when one or more of the tap coeffecients may be disregarded, an algorithm which requires less processing power may be selected and performed in preference to an algorithm which considers all of the coeffecients generated by the CIR estimation means 1.

9 Claims, 1 Drawing Sheet

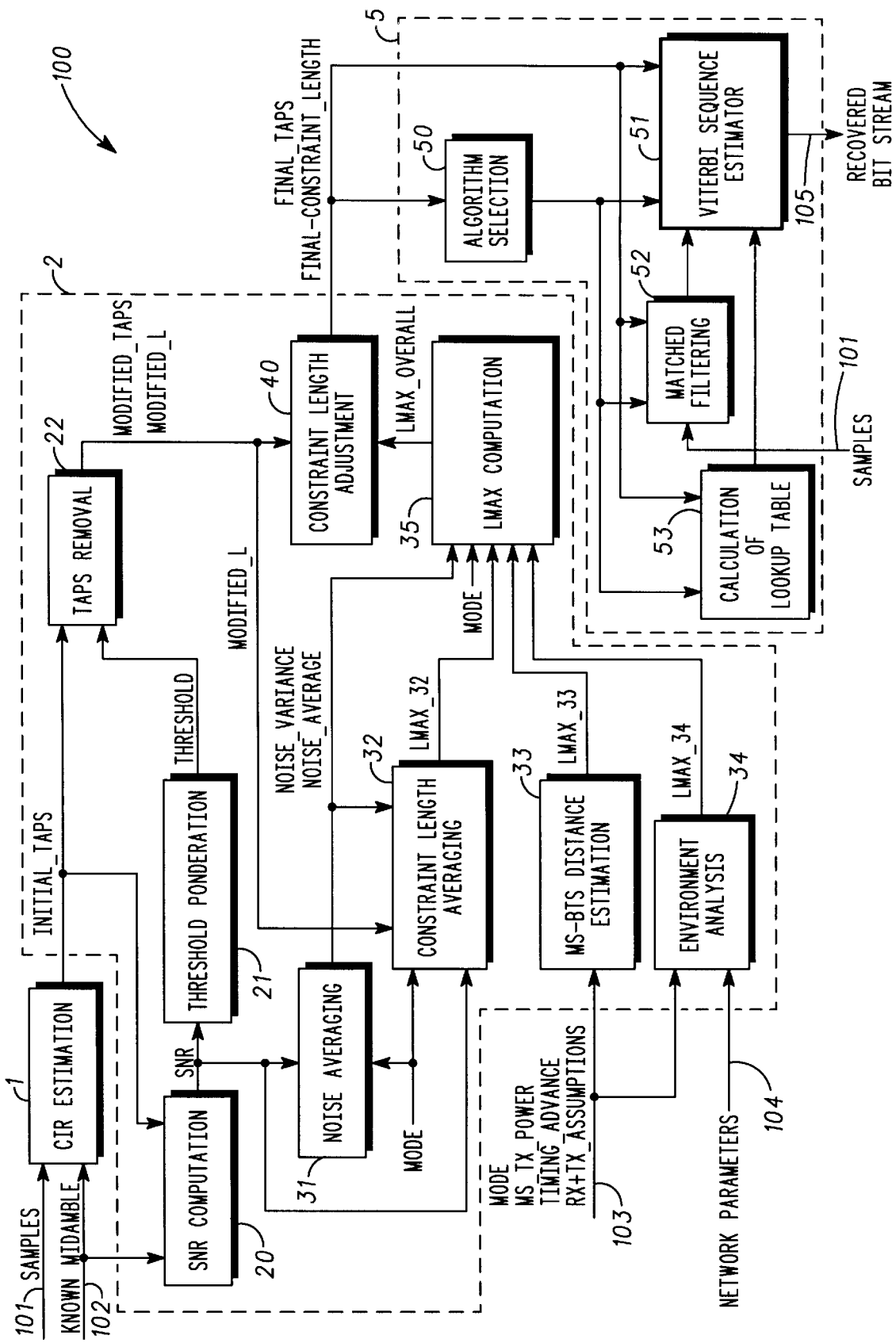

METHOD AND APPARATUS FOR PERFORMING EQUALIZATION IN A RADIO RECEIVER

FIELD OF THE INVENTION

The present invention relates to a method and apparatus for performing equalisation in a radio receiver. In particular, the present invention relates to a method of performing efficient equalisation in a GSM handset and apparatus therefor.

BACKGROUND OF THE INVENTION

Mobile telephone handsets include channel equalisers which form a part of the receiver circuitry in order to compensate signal corruption caused by multi-path signal dispersion. In many digital mobile telephone systems (e.g. GSM) standards are set which, amongst other things, set minimum requirements for the equaliser of each handset intended to form a part of the system.

The minimum standard required by the equaliser is usually quite high to account for worst case scenarios (e.g. hilly environments etc.). Unfortunately, in conventional equalisers this high standard of operation requires the equaliser to consume a significantly large amount of power. During standby mode the power consumption of the equaliser contributes a significant amount of the total power consumption of the handset.

The functioning of an equaliser is complex, however it can be described, at a fairly high level, as firstly attempting to identify an equivalent digital filter which corresponds to the corruption of the digital signal sent between the transmitter and the receiver (this is called estimating the Channel Impulse Response (CIR)) caused by both multi-path dispersion and the transmitting and receiving circuitry; and then secondly using the CIR thus obtained to recover as best as possible the originally sent signal from the (corrupted) received signal.

In order to obtain the CIR estimate, the transmitter frequently (as part of each frame) transmits a signal (the midamble), which is already known by the receiver, which then attempts to match the received signal with the signal as transmitted (which, as mentioned above, is already known by the receiver—i.e. it is stored locally). In this process the equaliser essentially attempts to perform synchronisation between the received signal and the locally stored transmitted signal. However, as a result of the multi-path dispersion a number of different synchronisation points in time may be (at least partially) appropriate.

For example, in a typical GSM mobile station receiver, the correlation between the locally stored midamble and the received signal is measured at 10 or 11 different times with a period of time, which is equal to the length of time taken to transmit a single bit of information, between each of the different times. The strength of the correlation at each of these times is measured and this value is termed a tap coeffecient or tap. At this point time synchronisation is performed in order to identify the most relevant taps, thereafter a fixed number of 5 taps are kept for further processing. The 5 tap coeffecients derived in this way are then representative of the CIR and can be used in the second stage of the equalisation (i.e. recovering the unknown part of the transmitted signal). International Puplished Patent Application No. WO 92/11708 describes such an equaliser which may be employed in the present application.

During the second stage of the equalisation process, the equaliser in essence performs an algorithm using the received data signals together with the tap coeffecients derived in the first stage as data for use in the algorithm. The performance of this algorithm is very intensive in terms of the amount of processing power required (expressed in terms of Millions of Instructions Per Second (MIPS)).). A typically used algorithm of this type is called the Viterbi algorithm for which the amount of processing power required is proportional to $2^L$, where L is the constraint length in units of the amount of time taken to transmit a single bit and in conventional GSM systems is numerically equal to the number of tap coeffecients minus 1 (i.e. 4 in the GSM system).

The present invention seeks to provide a method and apparatus for performing equalisation in a radio receiver which may reduce the amount of power consumed by the equaliser under certain circuimstances.

SUMMARY OF THE INVENTION

According to a first aspect of the present invention, there is provided an equaliser for performing equalisation in a radio receiver receiving a signal from a transmitter, there being a Channel between the transmitter and the receiver having a Channel Impulse Response, CIR, the equaliser comprising CIR estimation means for generating a plurality of tap coeffecients; assessment means for assessing the tap coeffecients generated by the CIR estimation means and for outputting an assessment signal; and a processing unit, adapted to receive the assessment signal, for selecting and performing one of a plurality of different equaliser algorithms on the basis of the assessment signal, whereby when one or more of the tap coeffecients may be disregarded, an algorithm which requires less processing power may be selected and performed in preference to an algorithm which considers all of the coeffecients generated by the CIR estimation means.

According to a second aspect of the present invention, there is provided a method of performing equalisation in a radio receiver receiving a signal from a transmitter, there being a Channel between the transmitter and the receiver having a Channel Impulse Response, CIR, the method comprising the steps of estimating the CIR by generating a plurality of tap coeffecients; assessing the tap coeffecients thus generated; and selecting and performing one of a plurality of different equaliser algorithms on the basis of the result of the step of assessing the tap coeffecients, whereby when one or more of the tap coeffecients may be disregarded, an algorithm which requires less processing power may be selected and performed in preference to an algorithm which considers all of the coeffecients obtained in the step of estimating the CIR.

Preferably, the step of assessing the tap coefficients incorporates taking into account the number of tap coefficients disregarded when equalising preceding frames transmitted by the transmitter. This may be achieved by a constraint length averaging means adapted to perform a statistical analysis of the constraint length used by or at some point generated within the equaliser during equalisation of previously transmitted frames.

The step of assessing the tap coefficients preferably includes taking into account the distance between the transmitter and the receiver. This is most easily derived by using a parameter transmitted by the transmitter to the receiver together with a mobile station to base transmitting station distance estimation means for receiving such a parameter. Where applicable, an excellent such parameter is that which informs the receiver how much power is required for the receiver to transmit a signal to the transmitter should it need to do so. Furthermore, the step of assessing the tap coefficients may additionally involve taking into account the environment in which the transmitter and/or the receiver are located. This is most conveniently done by an environment analysis means for analysing a parameter transmitted by the base transmitting station which includes this sort of information. Such parameters are likely to be included in future telecommunication standards such as UMTS.

Preferably, the step of assessing the tap coefficients incorporates an additional step of modifying some of the tap coefficients which may conveniently involve setting one or more of the tap coefficients to zero when they are below a certain threshold. Preferably the threshold is variable in inverse dependence on the Signal to Noise Ratio (SNR) of the received signal, whereby the lower the SNR, the greater is the setting of the threshold.

The step of assessing the tap coefficients preferably includes performing, where possible, a constraint length reduction in which one or more end tap coefficients are chosen to be disregarded. The end tap coefficients may correspond to either the least delayed or most delayed tap coefficients. In different circumstances, where a constant number of tap coefficients may be disregarded after each tap coefficient which may not be disregarded, a quasi constraint length reduction may be performed which comprises dividing (for the purposes of executing the equaliser algorithm) the constraint length by 1+the number of tap coefficients disregarded after each tap coefficient which is not disregarded, and performing the equaliser algorithm the same number of times, separately on each of the same number of subflows of received data signals or samples, each subflow being generated by considering only every second, third, fourth, etc. sample in each subflow depending on whether one, two, three, etc. taps have been removed after each non-disregarded tap, so as to generate two, three, four, etc. subflows. In other words, where there is a spacing N between the remaining taps, equalisation is performed separately over N subflows.

BRIEF DESCRIPTION OF THE FIGURE

In order that the present invention may be better understood, an embodiment thereof will now be described with reference to the accompanying drawing in which the sole Figure is a block diagram of an equaliser in accordance with the present invention.

DETAILED DESCRIPTION OF THE INVENTION

Equaliser 100 comprises Channel Impulse Response (CIR) estimation means 1, assessment means 2 and an equaliser algorithm processing unit 5. Assessment means 2 comprises a Signal to Noise Ratio (SNR) computation means 20; threshold ponderation means 21; taps removal means 22; noise averaging means 31; constraint length averaging means 32; Mobile Station (MS) to Base Transmitter Station (BTS) distance estimation means 33; environment analysis means 34; Lmax computation means 35; and constraint length adjustment means 40. Processing unit 5 comprises algorithm selection means 50; Viterbi sequence estimation means 51; matched filtering means 52; and look-up table 53.

Equaliser 100 forms part of a receiver (not shown) which in turn forms part of a digital mobile telephone handset (MS). The equaliser acts to equalise signals transmitted by a base station transmitter (BTS) which have been corrupted between the BTS and the MS as a result of multi-path distortion. In order to do this the CIR of the communication channel between the BTS and the MS is estimated by comparing a locally stored midamble with one which is transmitted by the BTS with each frame of data. The output of the equaliser 100 is a bit stream which should correspond to the bit stream transmitted by the BTS.

The equaliser 100 is shown as having four principal inputs 101,102,103,104 and 1 principal output 105. There are two inputs to the CIR estimation means 1. The first input to CIR estimation means 1 receives samples 101 of the received, demodulated signal which has been detected by the receiver of the MS. The second input to the CIR estimation means 1 receives a locally stored version of the midamble 102. The CIR estimation means generates a number of tap coefficients or taps which are representative of the magnitude of different components of the transmitted signal travelling along different-length paths giving rise to relative delays between the different components equal to the amount of time taken for the BTS to transmit a single bit within a frame of transmitted data. CIR estimation means of this type are well known and as such the structure and operation of this component will not be described further.

The illustrated equaliser is, by way of example only, suitable for use in a GSM system and as such CIR estimation means 1 generates 5 taps. Of course in systems other than GSM, more or less taps may need to be generated. The present invention is intended to be equally suitable for use in such systems although minor modifications to certain of the illustrated components (e.g. the CIR estimation means) may thereby be required.

The taps generated by the CIR estimation means 1 may be referred to as the Initial_Taps. The Initial_Taps are communicated both to the SNR computation means 20 and the taps removal means 22. The SNR computation means additionally receives the known midamble 102 as an input. On the basis of these two inputs (midamble 102 and the Initial_Taps) the SNR computation means is able to generate an SNR of the received signal. SNR computation means of this type is well known and will not be described in greater detail.

The SNR generated by the SNR computation means is communicated to the threshold ponderation means 21. Threshold ponderation means 21 generates a threshold level whose magnitude depends inversely upon the SNR. One possible implementation of threshold ponderation means is to use a look-up table. Other implementations will be apparent to persons skilled in the art.

The threshold generated by the threshold ponderation means 21 is communicated to the taps removal means 22. The taps removal means 22 also receives as an input the Initial_Taps generated by the CIR estimation means 1. The taps removal means 22 compares the Initial_Taps with the threshold and any taps which are less than the threshold are set to zero. The taps resulting from this procedure may be termed Modified_Taps. Modifying the taps in this way actually improves the CIR estimation because taps below the threshold level actually contain more noise than useful signal.

The principles of threshold ponderation and taps removal to reduce noise is described in greater detail in U.S. Pat. No. 5,251,233 the contents of which are incorporated herein with regards to the threshold ponderation and taps removal portions of the present invention. It should be noted, however, that in U.S. Pat. No. 5,251,233 although some of the taps are set to zero they are still taken into account by the equaliser when performing the equalisation algorithm the complexity of which is not therefore reduced in any way.

Taps removal means 22 additionally generates a modified constraint length, L, which may be termed Modified_L. This is something which is not done in U.S. Pat. No. 5,251,233. The constraint length, L, is essentially the time between the first and the last tap as measured in units of the time between adjacent bits in a burst. In the GSM system, this time is 3.69 $\mu$s and 5 taps are generated representing a separation in time between the first tap and the last tap of 4*3.69 $\mu$s thus giving an unmodified constraint length of 4. However, if the taps removal means 22 sets one of the outer edge taps (i.e. the first or last taps) to zero, the constraint length can be reduced by ignoring the or each tap which has been set to zero.

The SNR generated by the SNR computation means 20 is communicated to the noise averaging means 31 (in addition to being communicated to the threshold ponderation means 21). The noise averaging means 31 keeps track of how the SNR changes in time from one burst to another and generates parameters indicating the average value and variance of the SNR over a number (e.g. 30) of the most recently received bursts of transmission from the BTS. These parameters may be termed Noise_average and Noise_variance. In order to ensure that like bursts are compared with like bursts, the noise averaging means 31 additionally receives as an input a mode parameter indicating in which mode the MS is operating. The mode parameter additionally enables the equaliser to reinitialise its averaging means (i.e. the noise and constraint length averaging means) in the event of a handover from one BTS to another.

The constraint length averaging means 32 receives as inputs the Modified_L parameter output by the taps removal means 22, the SNR from SNR computation means 20 and the Noise_variance and Noise_average parameters generated by the noise averaging means 31. The primary function of the constraint length averaging means is to take into account the Modified_L parameter of recently received bursts to prevent spuriously high values of Modified_L being used when a smaller constraint length could be used instead. This is most easily performed by an algorithm which outputs a median value of a number of preceding values of Modified_L. This can be improved by applying a weighting to the values of Modified_L depending upon the SNR associated with each Modified_L value. This can be further enhanced by varying the weighting associated with a particular SNR in dependence on the Noise_variance and Noise_average parameters. The output of the constraint length averaging means 32 is an averaged constraint length which may be termed Lmax_32.

The MS to BTS distance estimation means 33 receives as an input one or more parameters which give an indication of the distance between the MS and the BTS. Such a parameter may for example be an MS_TX_Power parameter which is transmitted by the BTS to inform idling MS's within a particular cell how powerful their transmissions should be to ensure satisfactory reception by the BTS. This parameter depends upon the maximum possible distance between an MS and the BTS. In certain situations cells may be very small (e.g. in pico-cell environments) in which case the MS_TX_Power parameter will also be small and there will be very little opportunity for multi-path distortion. As such it will be possible to rely on an assumption that the maximum constraint length required will be at least a small amount less than that which is provided for by the system. Thus in the present case, a look up table is provided which outputs a constraint length parameter which may be termed Lmax_33 depending upon the value of MS_TX_Power. The details of the look up table are most easily established by field trials but may be estimated in advance using formulas well known to a person skilled in the art.

Environment analysis means 34 is similar to MS to BTS distance estimation means except that it is adapted to receive a parameter giving explicit information about the environment of the cell in which the MS is located (e.g. indoors, rural, urban, hilly, etc.). It also outputs a constraint length parameter which may be termed Lmax_34 on the basis of a look up table. It may additionally output a parameter indicating that certain intermediate taps may be ignored and a special type of reduced complexity equaliser algorithm be used, which will be described in greater detail below, in certain types of environment (e.g. certain types of hilly rural environments). Environmental parameters of this type are not currently found in the GMS system but are likely to be used in future systems (e.g. UMTS).

The Lmax computation means 35 receives parameters Lmax_32, Lmax_33 and Lmax_34 and arbitrates between these to generate an overall Lmax parameter, Lmax_overall. The preferred method of arbitration is to use Lmax_34 if available (which it won't be in a conventional GSM system) but otherwise to set Lmax_overall as the smaller of Lmax_32 and Lmax_33. Additionally, Lmax computation means may take into account the mode in which the MS is operating to detect, for example, handover situations when Lmax_32 should not be relied upon, and the Noise_variance and Noise_average parameters which may for example be used to detect very noisy busts when Lmax_33 may be less reliable than Lmax_32.

The parameter Lmax_overall is communicated to the constraint length adjustment means 40 together with the Modified_Taps and Modified_L output by the taps removal means 22. The constraint length adjustment means 40 firstly compares Modified_L with Lmax_overall and further modifies the Modified_Taps in the event that Modified_L is greater than Lmax_overall (indicating that the constraint length can safely be reduced). In order to reduce the constraint length it is neccessary to remove one or more of the outer edge taps. Clearly this should be done in such a way as to maintain the largest taps. Thus if only one tap needs to be removed, the first tap and the last tap should be compared and the smallest one removed. Where two taps are to be removed, there are three different pairs of taps which could be removed, the first two taps, the last two taps or the first and last taps (i.e. one at each end); these different pairs must be added together and compared, the smallest pair being removed. A suitable algorithm for ensuring this process is carried out correctly is clearly within the scope of a person skilled in the art.

Once any further modification of this nature has been performed on the Modified_Taps, the constraint length adjustment means 40 generates Final_Taps together with one or more parameters giving information about the Final_Taps. Such information for example will specify which taps out of the original 5 have been removed. As an alternative to supplying an additional parameter giving information about which taps have been removed, all 5 taps could still be maintained at this stage with those which are to be ignored downstream having been set to zero.

Additionally, constraint length adjustment means may attempt to perform a quasi constraint length reduction where it is possible to disregard, for example, alternate taps (e.g. taps 1 and 3) or all but 2 taps. In these circumstances, it is possible to perform a quasi increase in the length of time between bits in a frame for the purposes of the equaliser algorithm only; this then leads to the constraint length seeming to be reduced by the same amount as the quasi increase. For example, if taps 1 and 3 are removed, taps 0, 2 and 4 can be viewed as representing a system in which bits are transmitted only every 7.38 μs with a constraint length of 2.

In order to recover the data for all samples it is then neccessary to perform the algorithm twice, one time using "even" samples and the next time using "odd" samples ("even" here refers to samples 0,2,4 . . . , while "odd" refers to samples 1,3,5 . . . in terms of their time order). As a second example, where taps 1,2 and 3 have been removed leaving only taps 0 and 4, this can be viewed as a system having a constraint length of 1 with a period between adjacent bits of 14.76 μs; in order to recover the data for all samples it will be neccessary to run the algorithm 4 times on the following 4 subsets of the samples 4m, 4m+1, 4m+2 and 4m+3, where m is an integer varying between 0 and the total number of samples divided by 4.

The output from the constraint length adjustment means 40 forms the output from the assessment means 2 as a whole and is then communicated to the equaliser algorithm processing unit 5 where the equaliser algorithm is selected and performed. Within the equaliser algorithm processing unit 5 algorithm selection means 50 receives as an input the parameters generated by the constraint length adjustment means 40. From these parameters, algorithm selection means 50 is able to establish exactly how the equaliser algorithm should be run in order to minimise the complexity and therefore the number of MIPS consumed by the processor in performing the algorithm. It also attends to any minor adjustments required to other parts of the equaliser algorithm processing unit required to ensure that the equaliser algorithm is correctly run. The operation of the algorithm selection means is described in greater detail below.

The output from the constraint length adjustment means is additionally supplied to each of the Viterbi sequence estimation means 51, the matched filtering means 52 and look-up table 53. The basic operation of these three elements is well known in the art and will not be described in detail except with regards to how they differ significantly in accordance with the present invention from the corresponding elements in a conventional Viterbi sequence estimator. Note that equaliser 100 uses a Viterbi sequence algorithm as its equaliser algorithm; however, as will be apparent to a person skilled in the art, alternative algorithms could be employed instead such as a decision feedback algorithm, etc. Also note that look-up table 53 is associated with using a Viterbi algorithm and could be omitted if an alternative equaliser algorithm were employed instead.

The basic operation of elements 51, 52 and 53 is as follows. Matched filtering means 52 receives samples 101 and performs a digital filtering of the received samples 101 to partially account for the effect of the CIR of the channel between the transmitter of the BTS and the receiver of the MS. The digital filtering is performed by convoluting the the received samples with 101 with a time-inverted complex-conjugate of the CIR as represented by the Final_Taps. Once the received samples 101 have been filtered they are passed on to the Viterbi sequence estimation means 51. Look-up table 53 receives the output parameters from the constraint length adjustment means 40 and uses the CIR information contained therein to generate autocorrelation coefficients which are then in turn used to generate a plurality of values, based on these autocorrelation coefficients, to be stored in the look-up table 53 for efficient use by the Viterbi sequence estimation means 51. The way in which these values are calculated for a given constraint length is well known and will not be described in further detail here.

The Viterbi Sequence estimation means 51 uses the values stored in the look-up table 53 together with the filtered samples from the matched filtering means 52 as the inputs to a suitable Viterbi algorithm which generates a recovered bit stream which should correspond to the bit stream as sent by the transmitting BTS. Suitable algorithms for this purpose for a given constraint length are well known and will not be discussed further here.

In order to minimise the complexity of the Viterbi algorithm, algorithm selection means 50 analyses the Final_Taps, the Final_constraint_length and one or more parameters giving information about which taps have been removed (if any) and then decides how best the Viterbi algorithm should be performed, For example, if the last tap has been removed or set to zero, a Viterbi algorithm can be used which only considers 4 taps (there being a reduced constraint length of 3). Clearly look-up table 53 will also not need to calculate so many values under these circumstances either. Therefore algorithm selection means communicates to the Viterbi sequence estimation means 51 and the look-up table 53 so that they only expect to receive (or to have to process) 4 taps (or the first 4 taps). Clearly such an algorithm will mostly be the same as that used for dealing with 5 taps except that a significant number of steps can be omitted. This leads to a significant reduction in the number of MIPS required to execute the algorithm.

As a second example, if the first tap can be removed, the algorithm selection means again informs the Viterbi sequence estimation means 51 and the look-up table 53 that they should only expect to receive (or to have to process) 4 taps (or the first 4 taps). However in order to ensure that the assumed correspondence between the samples and the taps is not wrong, the algorithm selection means causes the samples at the matched filtering means 52 to be shifted so as to accomodate what corresponds to an additional delay in the channel compared to the 5 tap case. For this reason, the algorithm selection means 50 is also in communication with the matched filtering means 52.

As a third example, in the event that taps 1 and 3 have been removed or set to zero, algorithm selection means 50 informs the Viterbi sequence estimation means 51 and the look-up table 53 that they should only expect to receive (or to have to process) 3 taps (or the first, third and fifth taps). However, the algorithm selection means must also in this case arrange for the samples to be split into two groups of samples (even and odd), for the algorithm to be run twice once with each group of samples and for the recovered bit stream to be reassembled (by interleaving the two output streams) prior to outputting the recovered bit stream. Where only 2 taps remain similar actions are taken by the algorithm selection means to ensure that the least MIPS intensive algorithm is executed.

The implimentation of the above described equaliser is preferably by way of a suitably programmed Digital Signal Processor (DSP).

What is claimed is:

1. An equaliser for performing equalisation in a radio receiver receiving a signal from a transmitter, there being a Channel between the transmitter and the receiver having a Channel Impulse Response, CIR, the equaliser comprising CIR estimation means for generating a plurality of tap coeffecients; assessment means for assessing the tap coefficients generated by the CIR estimation means and for outputting an assessment signal; and an equaliser algorithm processing unit, adapted to receive the assessment signal, for selecting and performing one of a plurality of different equaliser algorithms on the basis of the assessment signal, whereby when one or more of the tap coefficients is or are disregarded, an algorithm which requires less processing power is selected and performed in preference to an algorithm which considers all of the coefficients generated by the CIR estimation means.

2. An equaliser as claimed in claim 1 wherein the assessment means includes constraint length averaging means adapted to perform a statistical analysis on the constrain length used by or at some point generated within the equaliser during equalisation of previously transmitted frames.

3. An equaliser as claimed in claim 1 wherein the assessment means includes a mobile station to base transmitting station distance estimation means for receiving a parameter transmitted by the transmitter indicating the maximum distance between the radio receiver and the transmitter.

4. An equaliser as claimed in claim 1 wherein the assessment means includes environment analysis means for receiving a parameter transmitted by the transmitter indicating the type of environment in which the transmitter is located.

5. An equaliser as claimed in claim 1 wherein the assessment means includes taps removal means for setting one or more of the tap coefficients to zero when they are below a certain threshold.

6. An equaliser as claimed in claim 5 wherein the assessment means further comprises threshold ponderation means for setting the threshold in inverse dependence to the signal to noise ratio of the received signal.

7. An equaliser as claimed in claim 1 wherein the assessment means further includes constraint length adjustment means for varying the constraint length of the received signal where possible for the purposes of performing the selected equaliser algorithm.

8. An equaliser as claimed in claim 1 wherein the equaliser algorithm processing unit us adapted to perform equalization separately over N-subflows of a data stream derived from the received signal, whenever there is a spacing of N between remaining tap coefficients.

9. A method of performing equalisation in a radio receiver receiving a signal from a transmitter, there being a Channel between the transmitter and the receiver having a Channel Impulse Response, CIR, the method comprising the steps of estimating the CIR by generating a plurality of tap coefficients; assessing the tap coefficients thus generated; and selecting and performing one of a plurality of different equaliser algorithms on the basis of the result of the step of assessing the tap coefficients, whereby when one or more of the tap coefficients is or are disregarded, an algorithm which requires less processing power is selected and performed in preference to an algorithm which considers all of the coefficients obtained in the step of estimating the CIR.

* * * * *